United States Patent

Gutov et al.

[11] Patent Number: 5,129,506
[45] Date of Patent: Jul. 14, 1992

[54] SPACE CONVEYOR FOR NEWSPAPER, BOOKS AND MAGAZINES

[75] Inventors: Sergei K. Gutov; Dmitry A. Plesser; Grigory A. Radutsky, all of Moscow, U.S.S.R.

[73] Assignee: Izdatelstvo "Izvestia Sovetov narodnykh deputatov SSSR", Moscow, U.S.S.R.

[21] Appl. No.: 767,562

[22] Filed: Sep. 30, 1991

Related U.S. Application Data

[63] Continuation of Ser. No. 499,274, Jun. 13, 1990, abandoned.

[30] Foreign Application Priority Data

Oct. 20, 1988 [SU] U.S.S.R. ............... 4492194

[51] Int. Cl.⁵ .............................. B65G 17/36
[52] U.S. Cl. ................... 198/712; 198/845
[58] Field of Search ............. 198/712, 838, 845

[56] References Cited

U.S. PATENT DOCUMENTS

| | | | |
|---|---|---|---|
| 2,526,563 | 10/1950 | Keen | 198/845 |
| 2,850,149 | 9/1958 | Bankauf | 198/838 |
| 3,107,778 | 10/1963 | Jordan | 198/838 X |
| 3,589,503 | 6/1969 | Leach . | |
| 3,753,487 | 6/1969 | Leach . | |
| 3,865,229 | 2/1975 | Velander | 198/845 X |
| 4,638,906 | 1/1987 | Winiasz | 198/845 X |
| 4,729,470 | 3/1988 | Bacigalupe et al. | 198/838 |
| 4,838,410 | 6/1989 | Gough | 198/712 X |
| 4,903,823 | 2/1990 | Plesser et al. | 198/712 |

FOREIGN PATENT DOCUMENTS

| | | |
|---|---|---|
| 3142346 | 7/1982 | Fed. Rep. of Germany . |
| 3790593 | 10/1988 | Fed. Rep. of Germany . |
| 2252268 | 6/1975 | France . |
| 2323602 | 4/1977 | France . |
| 592562 | 10/1977 | Switzerland . |
| 136236 | 3/1960 | U.S.S.R. ............. 198/845 |
| 873496 | 7/1961 | United Kingdom ....... 198/845 |

Primary Examiner—Joseph E. Valenza
Attorney, Agent, or Firm—Fleit, Jacobson, Cohn, Price, Holman & Stern

[57] ABSTRACT

The invention relates to space conveyers.

The conveyer comprises a traction unit (4), carrying rolling-contact bearings moving along a guide track made in the form of supporting elements (8) arranged uniformly along the entire length of the conveyer with the formation of a closed polygon in the cross-section perpendicular to the conveyer axis. The rolling-contact bearings are rollers 10 mounted in pairs in the intersecting pins (11, 12). Each roller (10) is arranged between two adjacent supporting elements (8) of the guide track.

2 Claims, 1 Drawing Sheet

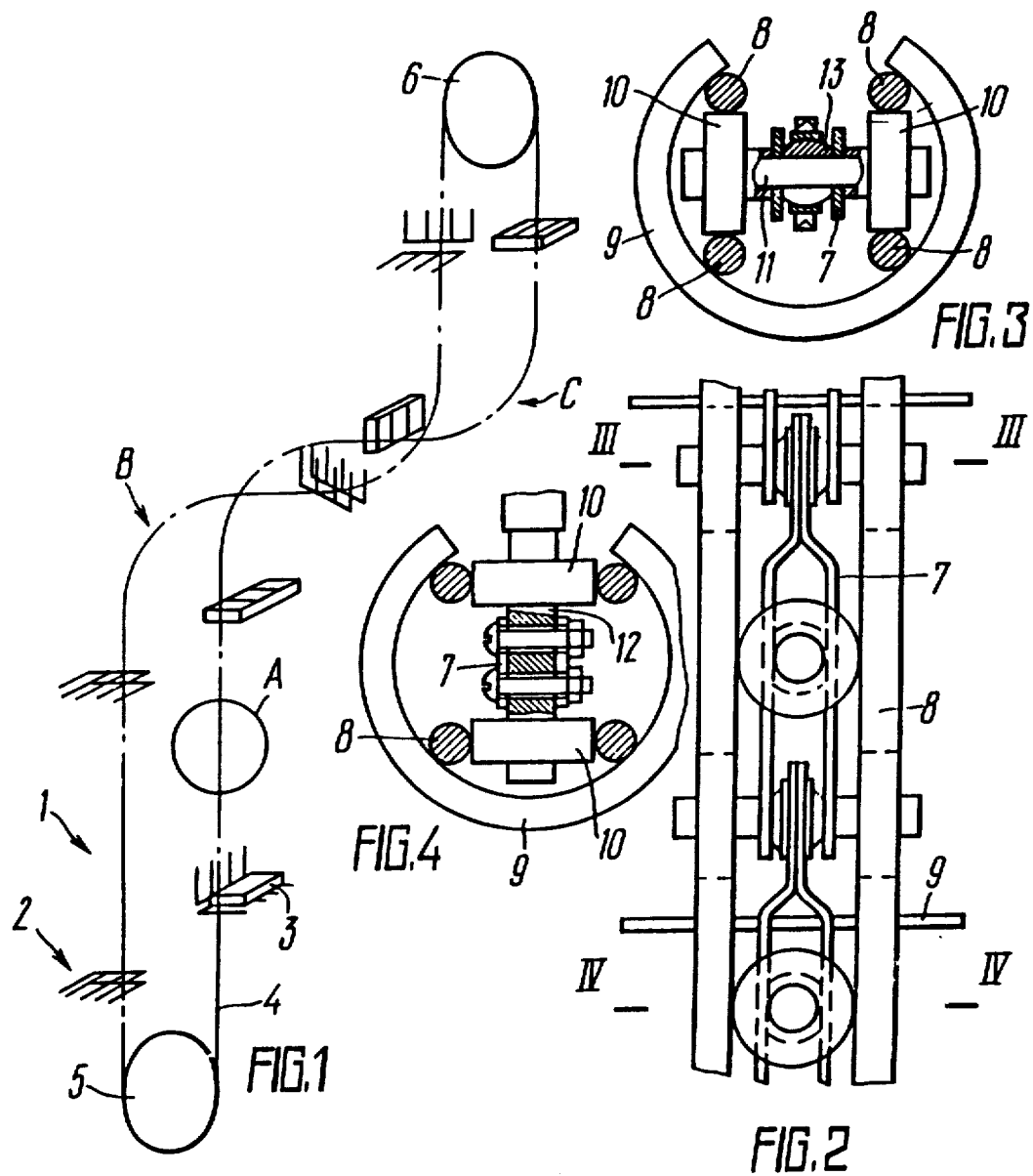

SPACE CONVEYOR FOR NEWSPAPER, BOOKS AND MAGAZINES

This is a continuation of application Ser. No. 07/499,274, filed Jun. 13, 1990 now abandoned.

TECHNICAL FIELD

The invention relates to conveyers for receiving printed matter in the form of newspapers from printing machines and its conveyance to devices for subsequent treatment, namely, forming stacks, packing the latter, etc., and more specifically, to space conveyers for moving newspapers, books and magazines.

BACKGROUND OF THE INVENTION

Known in the art is a conveyer for transporting newspapers from printing machines to devices for their treatment, comprising a continuous chain formed by hingedly interconnected carriages moved by wheels along a guide track (CH, A, 592562).

In the prior art conveyer the guide track is made in the form of "C"-shaped box profile which is rectangular in cross-section with a groove in one of the sides passing along the longitudinal axis of the track. Moving inside this profile are the chain carriages, each being fitted with three wheels. One wheel is introduced in the groove of the "C"-shaped profile of the track and interacts with its ends by its rim. The other two wheels are arranged inside the profile to both sides of the first one and are connected by a common pin perpendicular to the pin of the first wheel.

The prior art conveyer, although it allows for spatial movement of printed newspapers from printing machines towards devices for their treatment, yet, it is metal intensive because its guide track is made in the form of a box profile and is hard to manufacture due to the profile sections strongly in space. Besides, in this construction it is only two wheels that can be supporting ones, while the third wheel can only function as a guide. This limits the possibility of selecting the trajectory of the space conveyer. For example, it cannot be bent in the plane perpendicular to the walls of the C-shaped profile along which the carriage wheels roll because in this case the chain links are arranged in cantilever on guide rollers in the curvalinear section of the track, while the rest link rollers do not roll, but rub against the track walls to result in the damage of the guide rollers hanging on a narrow end of the C-shaped tack profile, skewness of the carriages, wearout of their free wheels and the track.

Closest to the claimed conveyer by its technical essence is a space conveyer comprising a traction unit in the form of hingedly inter connected links, each accommodating support rolling-contact bearings and load carriers, as well as a guide track in the form of a number of supporting elements (Voröffentlichung DE 3790593T). In this conveyer the rolling-contact beatings are made in the form of ball supports. In so doing, each link is shaped as a race to house the ball support therein, and the supporting elements of the guide track are equidistant from the latter's axis and from a closed polygon in the section perpendicular to the conveyer axis. In order to stabilize the load carrier position because of a large number of the degrees of freedom of the ball support, each link has a guide roller.

Although this conveyer provides for the selection of virtually any trajectory of movement of the traction unit, the construction of its links is intricate, because in order to ensure free rotation of the ball support it is necessary to choose such materials for the ball and race which would ensure a lesser coefficient of friction therebetween than between the ball and the supporting elements of the guide track.

The satisfaction of these requirements is associated with over-coming serious technological difficulties and the conveyer operation reliability largely depends on wear resistance of the ball support material.

The invention is based on the problem of developing a space conveyer with such a design of the rolling-contact bearings, and with such arrangement thereof in the links of the traction unit and interaction with the supporting elements which would ensure the design of the conveyer simple and technological in manufacture.

SUMMARY OF THE INVENTION

This problem is solved by the fact that in the space conveyer for moving newspapers, books and magazines, comprising a traction unit with load carriers which is made in the form of hingedly interconnected links which carry rolling-contact bearings, moving along a guide track, made in the form of a number of supporting elements arranged uniformly with respect to the conveyer longitudinal axis along its entire length with the formation of a closed polygon in the section perpendicular to the conveyer axis, according to the invention, the rolling-contact bearings of each link rollers mounted in pairs at the intersecting pins, one of which is aligned with the hinge pin, the other is secured in the link of the traction unit, in so doing, each roller is placed between the two adjacent supporting elements of the guide track.

Availability of two pairs of rollers with the intersecting pins ensures their uniform loading, namely, alternate operation of each pair of rollers as a supporting or guide elements, respectively, or simultaneous operation as supporting elements at helical parts of the trajectory to enhance reliability with any configuration of the trajectory dispensing with the use of complex ball supports. The availability of two pairs of rollers with the intersecting pins ensures stable position of the load carrier due to fewer degrees of freedom without using additional elements.

The combination of the prior art guide track with two pairs of rollers having intersecting pins ensures new interplay of rollers, one pair of which is a supporting one in certain points of the trajectory and the other—a guide one and vice versa, as distinct from the use of wheels in the prior art combination of features according to CH, A, 592562. Besides, in comparison with the prototype the design is streamlined and reliability is enhanced, and compared to an analogue there is greater possibility of choosing a trajectory to rule out seizing of the rollers and wearout of the guide track. It is obvious that using two pairs of rollers allows for streamlining the trajectory and enhancing reliability with lower metal intensity.

BRIEF DESCRIPTION OF DRAWINGS

The invention will become more apparent by describing a specific exemplary embodiment thereof, reference being made to the accompanying drawings, wherein:

FIG. 1 schematically shows a conveyer of the invention;

FIG. 2 is point "A" as in FIG. 1;

FIG. 3 is a cross-section taken along III—III as in FIG. 2;

FIG. 4 is a cross-section taken along IV—IV as in FIG. 2;

BEST MODE FOR CARRYING OUT THE INVENTION

As illustrated in FIG. 1 a space conveyer 1 for transporting piece-goods 3 with the aid of a load carrier 2 has a closed traction unit 4 moved by means of sprockets 5, 6 using a drive (not shown). FIG. 2 shows that the traction unit 4 is made in the form of links 7 hingedly interconnected by virtue of spherical hinges, and is accommodated between supporting elements 8 of the guide track (FIG. 2, 3) forming this track, and secured by swivel tighteners 9 to keep the distance between the supporting elements 8 constant. The supporting elements 8 are arranged uniformly relative to the longitudinal axis of the conveyer along its entire length to form a closed polygon in the cross section perpendicular to the conveyer axis, as shown in FIG. 3, 4.

The links 7 of the traction unit move along the supporting elements 8 by means of rolling-contact bearings which are rollers 10 arranged in pairs in intersecting carrier pins 11, 12. The pin 11 (FIG. 3) is aligned with that of the spherical hinge 13 connecting the links 7. The pin 12 (FIG. 4) is fastened in the link 7 of the traction unit.

Each of the rollers 10 is arranged between two adjacent supporting elements 8 in the guide track.

The conveyer of invention operates as follows. As the traction unit 4 moves, the rollers 10 and 12 roll along two pairs of the supporting elements 8, respectively, providing reliable maintenance of the links 7 with the load carriers 2 carrying the piece-goods 3 on the guide track. It is obvious that this is ensured by the interplay of the rollers 10 with respective pairs of the supporting elements 8. As the link passes the "B" section (FIG. 1), one pair of rollers will receive the whole load from the load carriers 2 with the piece-goods 3, and the other paid will operate as a guide one. Given the bend "C", for one, the rollers 10 reverse functions in another plane. Equal value of the two pairs of rollers helps provide high operation reliability and stability of the load carrier position without the danger of seizing the rollers or wearout of the elements of the conveyer, given the latter is of simple design.

INDUSTRIAL APPLICABILITY

The space conveyer is extensively used for transporting stacks of newspapers, books and magazines from printing machines to devices for their treatment, i.e., for packing, banding and the like.

We claim:

1. A space conveyer suitable for transporting stacks of newspapers, books and magazines, comprising a traction unit (4) with load carriers (2), the conveyor made in the form of hingedly interconnected links, connected together by hinge pins incorporating spherical hinge, the links carrying rolling-contact bearings moveable along a guide track made in the form of several supporting elements (8), arranged uniformly with respect to a longitudinal axis of the conveyer (1) along its entire length, the supporting elements being located so as to define a closed polygon in a cross section perpendicular to the conveyer (1) axis, characterized in that the rolling-contact bearings of each link (7) comprise rollers (10) arranged in pairs on respective carrier pins (11, 12), one carrier pin (11) being aligned with a respective hinge pin (13) and another carrier pin (12) being secured in the link (7) at an angle to the one pin, and each roller (10) is arranged between two adjacent supporting elements (8) of the guide track.

2. A conveyer as claimed in claim 1 wherein the one carrier pin is spaced from said another carrier pin lengthwise of the link.

* * * * *